United States Patent [19]

Otter

[11] Patent Number: 4,671,325

[45] Date of Patent: Jun. 9, 1987

[54] PRESSURE ACUMMULATOR WITH SEAL ASSEMBLY

[75] Inventor: Stanley E. Otter, Bedington, England

[73] Assignee: American Olaer, Inc., New York, N.Y.

[21] Appl. No.: 822,069

[22] Filed: Jan. 24, 1986

[30] Foreign Application Priority Data

Jan. 28, 1985 [GB] United Kingdom ................. 8502102

[51] Int. Cl.[4] ............................................. F16L 55/04

[52] U.S. Cl. ....................................... 138/30; 277/180

[58] Field of Search ........................ 138/30; 220/85 B; 277/180

[56] References Cited

U.S. PATENT DOCUMENTS

| | | | |
|---|---|---|---|
| 368,189 | 8/1887 | Carter | 277/18 |
| 2,513,178 | 6/1950 | Jackson | 277/180 X |
| 3,153,541 | 10/1964 | Rudder | 277/180 |
| 4,080,996 | 3/1978 | Zahid | 138/30 |
| 4,273,158 | 6/1981 | Chun | 138/30 |
| 4,386,627 | 6/1983 | Lachaux | 138/30 |

FOREIGN PATENT DOCUMENTS

| | | | |
|---|---|---|---|
| 565642 | 11/1932 | Fed. Rep. of Germany | 277/180 |

*Primary Examiner*—James E. Bryant, II
*Attorney, Agent, or Firm*—Arthur B. Colvin

[57] ABSTRACT

A compression seal between opposed faces (3 & 4) of two metal members (1 & 2) comprises a metal ring (5) having a relatively thin annular web (7) and thickened beads (8 & 9) at its inner and outer peripheries defining an annular trough on each side of the web. The beads terminate in knife edges (10), washers (6) of deformable material are located on each side of the web (7) and project above the level of the knife edges (10). When the assembly is axially compressed, the deformable washers fill the troughs and any excess material is cut off as the knife edges (10) contact the members (1 & 2) thereby presenting a continuous metal surface to the exterior.

2 Claims, 3 Drawing Figures

PRESSURE ACUMMULATOR WITH SEAL ASSEMBLY

The present invention relates to sealing assemblies for producing fluid-tight seals between two members.

According to one aspect of the invention there is provided a compression sealing ring to form a seal under compressive pressure between opposed faces of two members, the assembly comprising a relatively rigid element having on both faces of a web portion thereof inner and outer annular knife edges which bound a respective annular trough and which in use bear against the said face of the respective member and an annular washer of deformable material in each trough, the height of each deformable washer prior to compression of the sealing assembly being greater than the height of the respective knife edges relative to the respective trough.

According to a further aspect of the invention, there is provided a compression sealing assembly forming a seal under compressive pressure against a face of a member, the assembly comprising a relatively rigid element having inner and outer annular knife edges bounding an annular trough bearing against an annular surface of the said member and an annular washer of deformable material filling the trough, the height of the deformable washer prior to compression of the sealing assembly being greater than the height of the knife edges relative to the trough.

BRIEF DESCRIPTION OF THE DRAWINGS

The invention will now be further described by way of example with reference to the accompanying drawings, in which.

Figure 1:
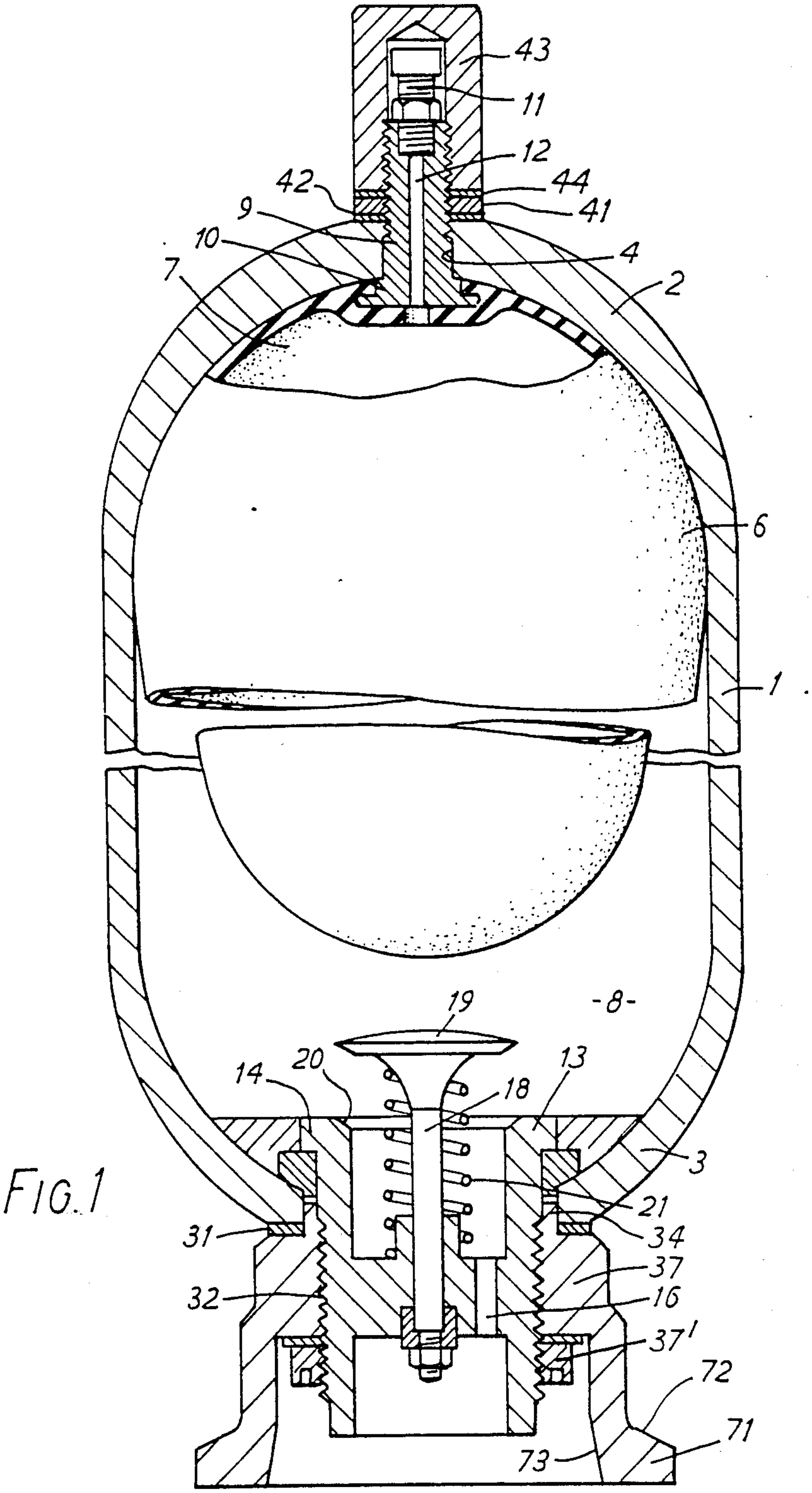
FIG. 1 is an axial sectional view of a hydro pneumatic pressure accumulator.

The hydro pneumatic pressure accumulator shown in FIG. 1 comprises a steel shell 1 which has been formed from a tubular blank to provide hemispherical upper and lower ends 2 and 3 formed respectively with a gas port 4 and a liquid port 5. The interior of the container 1 is divided by an elastomeric bladder 6 into a gas chamber 7 within the bladder and a liquid chamber 8 outside the bladder. A gas charging fitting 9 has a head portion 10 engaged in the bladder 6 and extends upwardly and outwards through the gas port 4 to carry a gas charging valve 11 through which gas can be introduced under pressure to charge the gas chamber 7 through a central passage 12 in the fitting 9.

A liquid outlet member 13 has a top flange 14 of external diameter slightly less than the internal diameter of the oil port 5. The outlet member 13 can thus be introduced into the interior of the container through the liquid port 5 and can then be retained by means of a divided ring 15 the two parts of which are bonded to an elastomeric ring 16 which can be folded to enable it, together with the two segments of the ring 15, to be introduced into the container through the oil port 5 and then engaged on the outlet member 13 under the flange 14.

The outlet fitting 13 has a plurality of outlet passages 16 arranged in a ring about a central ball 17 in which the stem of a poppet valve member 18 is slidable between a closed position in which a head 19 of the valve member 18 seats on a valve seat 20 on the other end of the outlet member 13 to prevent extrusion of the bladder 6 into the outlet. A spring 21 normally holds the valve member 18 in its upper, open position but will yield to allow the valve to be closed by the bladder 6.

The accumulator so far described is essentially conventional apart from the shape of the lower part of the outlet member 13.

In accordance with the invention, a neck member 30 is secured to the container 1 by means of the outlet member 13 with the interposition of sealing means 31. For this purpose, the outlet member 13 has a long screw threaded surface 32 on which corresponding screw threads on the interior of the neck member 30 are engaged. The upper end of the neck member 30 has a short spigot extension 34 which fits snugly in the liquid port 5.

The lowermost outer end of the outlet member 13 is shaped to engage a tool, for example, by being formed with an internal polygonal formation 35 or be formed with a set of external flats on an unthreaded end portion 36 of its outer surface. An upper portion 37 of the neck member 30 is also formed with a set of flats for engagement by an appropriate spanner. During tightening of the assembly shown in FIG. 1, the outlet member 13 may be turned relative to the container 1 and neck member 30 to provide appropriate preloading on the annular seal 31, without relative rotation of the neck member 37 and the container 1.

To prevent loosening off the screw threaded connection, as a result for example of vibration in operation, the threads may be coated with an appropriate anaerobic adhesive or an appropriate mechanical locking means may be employed. For example, as shown in the drawings, a locking ring 37 may be installed on the end portion of the screw threads on the outlet member 13 and/or other locking devices may be employed.

In its simplest form, the annular seal 31 may comprise a copper ring. Other possibilities are a steel ring and a composite arrangement constiting of an outer steel ring and an inner seal for example of P.T.F.E.

Similar sealing arrangements must be used at the upper end of the accumulator between a securing nut 41 on the gas fitting 9 at 42, and between the nut 41 and an end cap 43 which protects and seals the gas charging valve 11, this sealing arrangement being indicated at 44.

The completed accumulator is protected by an appropriate external paint system for the environment in which it is to be used. One example is a two-coat epoxy resin paint system.

Figure 2:
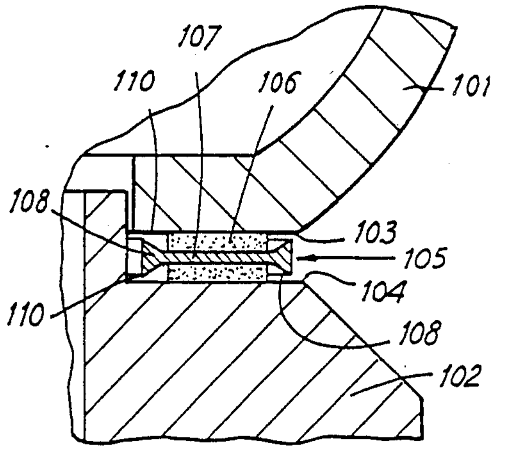
FIGS. 2 and 3 show a sealing arrangement according to the invention respectively before and after compression.
Figure 3:
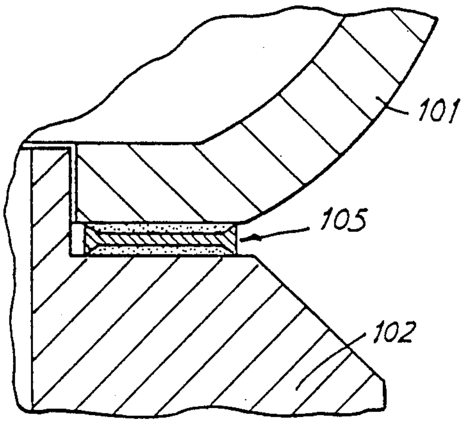

FIGS. 2 and 3 show a sealing arrangement which can be used between the container 101 and the neck member 102. A similar (but smaller) arrangement may be used for the seals 42 and 44 on either side of the nut 41 in respect of the gas valve in FIG. 1 and also in the other versions of the accumulator.

In this arrangement, both the container 101 and neck member 102 have opposed flat surfaces 103 and 104 respectively. Between these surfaces is positioned a sealing assembly comprising an annular support member 105 and two washers 106 of deformable sealing material such as copper, fibre or polytetrafluoroethylene. The member 105 is formed of the same metal as the container 101 and neck member 102. In the uncompressed state shown in FIG. 2, the member 105 has a relatively thin radial annular web portion 107 and thickened bead portions 108 and 109 at its inner and outer peripheries. Each bead portion 108, 109 terminates in a knife edge 110. The beads 108 and 109 and the web 107 form hollows or troughs on each side of the web 107. Located in the troughs are the two washers 106, the height of which is greater than the height of the knife edges 110 above the web. The volume of each washer 106 is equal to or slightly greater than the volume of the trough (considered up to the height of the knife edges 110).

When the assembly is tightened (by rotating the valve assembly 111 relative to the neck member 102) the washers 106 are deformed until they fill their respective troughs on either side of the web 107. Thereafter, the knife edges 110 engage the surfaces 103 and 104 thereby forming a continuous metal exterior surface from the container 101 to the neck member 102 (and also a continuous internal metal surface between these two members). If the volume of a washer 106 is greater than that of its trough, some of the material of the washer will be extruded through the gap between one of the knife edges and the adjacent sealing surface. During the final part of the tightening, however, the knife edge will cut through any such extruding material, thereby ensuring the continuous metal outer surface which can therefore be painted as required.

The accumulators described are particularly suitable for use in seawater, particularly where the container, neck member and at least the exterior surface of the sealing means between the two are all formed of the same metal, thereby preventing a electrolitic action.

I claim:

1. A hydro-pneumatic pressure accumulator comprising a container having substantially hemispherical ends, one of which is formed with a liquid port, a bladder mounted within the container to divide the interior of the container into a gas chamber and a liquid chamber, a liquid outlet member retained in the liquid port and extending outwardly therefrom, a valve member disposed in the outlet member, the liquid outlet member being provided with means for preventing extrusion of the bladder through the outlet member, and a neck member surrounding the outwardly extending portion of the outlet member, the neck member being secured to the container by the outlet member, the neck member and the container being provided with substantially flat seal receiving surfaces, sealing means between said seal receiving surfaces, said sealing means comprising a rigid annular member having a central web, thickened peripheral portions formed at the radial innermost and outermost edges of said web, said thickened portions projecting above and below the surface of said web, said thickened portions terminating in inner and outer knife edges which define the maximum thickness of said annular member, the knife edges above said web and the knife edges below said web defining therebetween upper and lower annular troughs respectively, an annular washer of deformable material in each said trough, the height of each said washer in the unstressed condition being greater than the maximum height of its respective trough, and the volume of each said washer being greater than the volume of its respective trough, said knife edges bearing against the faces of said neck member and said container, said washers filling the entirety of said troughs.

2. An accumulator in accordance with claim 1 wherein said rigid annular member and said container are comprised of steel.

* * * * *